(12) United States Patent
Gorski

(10) Patent No.: US 9,589,228 B1
(45) Date of Patent: Mar. 7, 2017

(54) AUTOMATED CONTENT GENERATION

(71) Applicant: Amazon Technologies, Inc., Reno, NV (US)

(72) Inventor: Christopher Alex Gorski, Washington, DC (US)

(73) Assignee: Amazon Technologies, Inc., Reno, NV (US)

( * ) Notice: Subject to any disclaimer, the term of this patent is extended or adjusted under 35 U.S.C. 154(b) by 423 days.

(21) Appl. No.: 14/207,334

(22) Filed: Mar. 12, 2014

(51) Int. Cl.
*G06N 5/02* (2006.01)

(52) U.S. Cl.
CPC .................... *G06N 5/025* (2013.01)

(58) Field of Classification Search
CPC ........... G06N 5/00; G06N 5/025; G06F 15/18
USPC .......................................................... 706/47
See application file for complete search history.

(56) References Cited

U.S. PATENT DOCUMENTS

| | | | |
|---|---|---|---|
| 2003/0135379 A1* | 7/2003 | Schirmer | G06F 17/30616 705/344 |
| 2006/0064631 A1 | 3/2006 | Parker | |
| 2008/0256066 A1* | 10/2008 | Zuckerman | G06F 17/24 |
| 2010/0162115 A1* | 6/2010 | Ringewald | G06F 17/30743 715/716 |
| 2011/0217685 A1* | 9/2011 | Srinivasan | G09B 7/00 434/323 |
| 2011/0246182 A1* | 10/2011 | Allen | G06F 17/248 704/9 |
| 2013/0138426 A1* | 5/2013 | DelRocco | G06F 17/30997 704/9 |
| 2014/0143047 A1* | 5/2014 | Carter | G06Q 30/0276 705/14.49 |
| 2014/0245115 A1* | 8/2014 | Zhang | G06F 17/24 715/202 |
| 2014/0324740 A1* | 10/2014 | Garera | G06N 5/022 706/12 |
| 2015/0317566 A1* | 11/2015 | Brooks | G06Q 30/02 706/47 |

OTHER PUBLICATIONS

Reiter E. et al., "Automatic Generation of Technical Documentation", Applied Articial Intelligence, vol. 9, 1995.*

* cited by examiner

*Primary Examiner* — Dave Misir
(74) *Attorney, Agent, or Firm* — Lowenstein Sandler LLP

(57) ABSTRACT

Systems and methods for creating and revising information objects, such as proposed storylines, product descriptions, etc., are provided. In some examples, a computational linguistics program may be used to generate an information object, the fitness of which may be assessed using an AAI as the fitness function of an evolutionary algorithm. Satisfactory information objects may be forwarded for execution, e.g. production, whereas unsatisfactory objects may be refined by adapting the objects themselves and/or the algorithm used to generate the objects using evolutionary algorithm techniques.

22 Claims, 8 Drawing Sheets

AUTOMATED CONTENT GENERATION

BACKGROUND

The present subject matter involves concepts from distinct areas of computational linguistics, artificial-artificial intelligence and evolutionary algorithms.

Computational linguistics is commonly understood as statistical or rule-based modeling of natural language from a computational perspective. Computational linguistics involves computational models of various kinds of linguistic patterns and/or phenomena. These models may be "knowledge-based" ("hand-crafted" or "heuristic") or "data-driven" ("statistical" or "empirical"). Computational linguistics can be used both in analyzing language (recognition) or synthesizing language (generation). There is ongoing interest in both areas, including using computational linguistics as part of an artificial intelligence (AI) that synthesizes language to create textual content.

Artificial-Artificial Intelligence (AAI) are methods through which a computer can "ask" humans to perform tasks, which can be helpful in areas where computers are deemed unsuitable or where programming has otherwise not reached a level of proficiency for performing the task. Some areas where AAI may find applicability considering the current state of technology include evaluating beauty, translating text and finding specific objects in photos. One example of such a system is Amazon.com's® Mechanical TURK (MTURK), which enables companies to programmatically access a diverse, on-demand workforce through an Internet portal to accomplish specified tasks.

An evolutionary algorithm (EA) is a subset of evolutionary computation, that uses mechanisms inspired by biological evolution, such as reproduction, mutation, recombination, and selection. Candidate solutions to the optimization problem may be evaluated by a "fitness function" to determine the quality of the solutions. Evolution of the population then takes place after the repeated application of the process. For example, each design solution may be awarded a score to indicate how close the design solution is to meeting the overall specification. The score may be generated by applying the fitness function to results obtained from that solution. After each round of simulation, a number of the "worst" design solutions may be removed, and new design solutions may be created based on the "best" design solutions, which, over time, may result in populations of improved solution(s).

Today, some aspects of these ideas are being used individually, in primitive forms, to generate products or other content. However, lack of popularity of these items, and lack of broad adoption by companies to use such software, indicates that the quality and aesthetic appeal of the work is poor.

As such, there are continuing needs for systems and methods that generate high quality creative goods and/or content.

BRIEF DESCRIPTION OF THE DRAWINGS

Various embodiments in accordance with the present disclosure will be described with reference to the drawings, in which.

DETAILED DESCRIPTION

Figure 1:
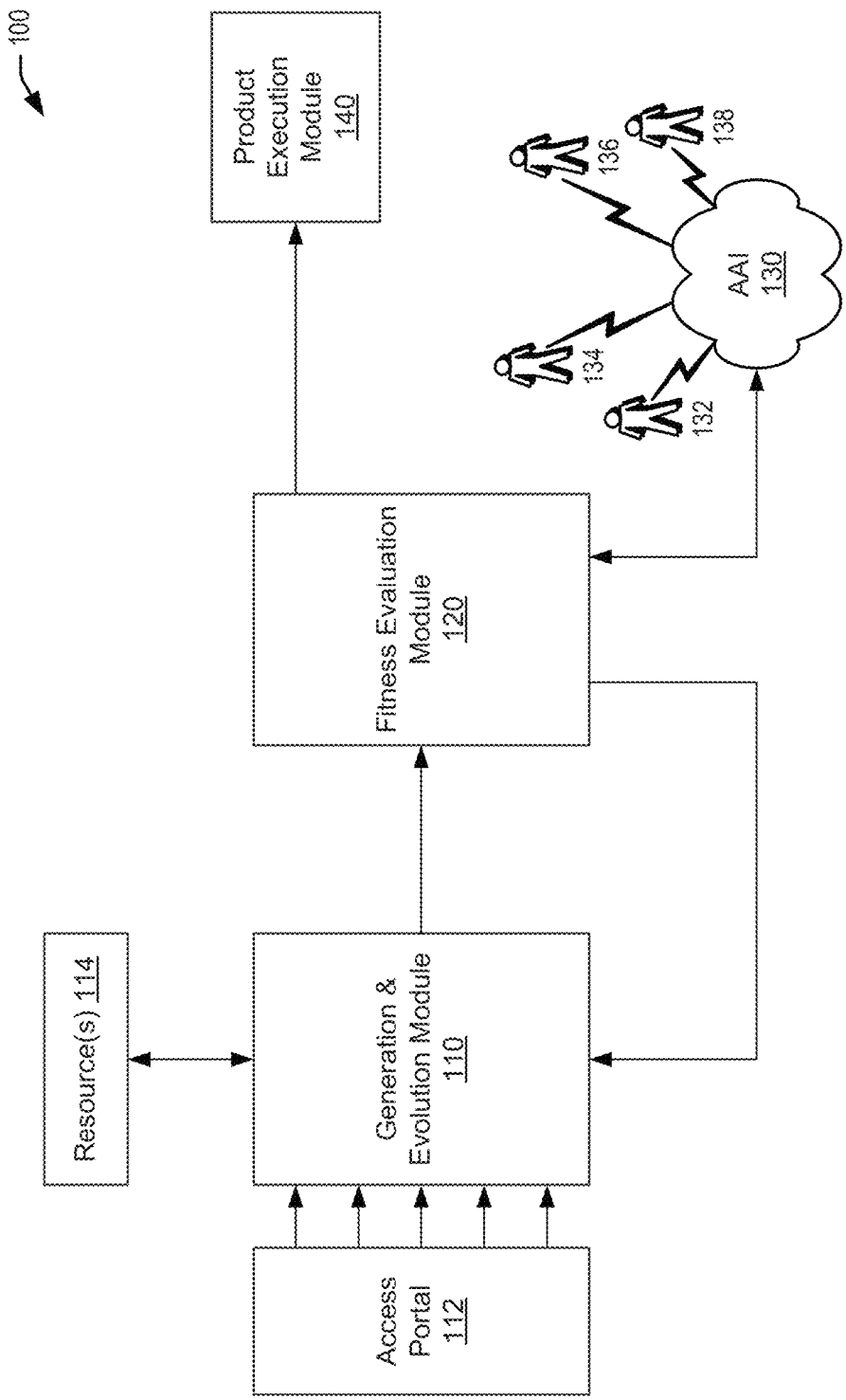
FIG. 1 illustrates a network environment including an information object generator, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain aspects of the disclosure, systems and methods for creating and revising information objects, such as proposed storylines, product descriptions, etc., are provided. In some examples, a computational linguistics program may be used to generate an information object, the fitness of which may be assessed using an AAI as the fitness function of an evolutionary algorithm. Satisfactory information objects may be forwarded for execution, e.g. production, whereas unsatisfactory objects may be refined by adapting the objects themselves and/or the algorithm used to generate the objects using evolutionary algorithm techniques.

Examples may include generating, by a computational linguistic program on a computer system, an information object including descriptive language. The information object may be, for example, a proposed storyline or a proposed product description.

Examples may include assigning a plurality of assessment parameters to the information object. The assessment parameters may define information to be used in assessing the suitability of the information object, and/or information that may be modified by evolutionary algorithms, as described further herein. Assigning the assessment parameters may be performed by a user, e.g. during the information object generation process, and/or may be automatically performed by the computer system.

Examples may include assigning a category identifier to the information object. Assigning the category identifier may be performed by a user, e.g. during the information object generation process, and/or may be automatically performed by the computer system.

Examples may include distributing, by a computerized network, the information object to a plurality of human evaluators and/or receiving responses from the human evaluators including assessments of the information object based at least in part on the plurality of assessment parameters and the category identifier.

Examples may include rating, by an evolutionary algorithm, the information object based at least in part on the responses from the human evaluators.

In some examples, a determination may be made regarding whether to forward the information object to an execution module based at least in part on the rating exceeding a first threshold; adjust at least one of the descriptive language or the computational linguistic program based on the rating exceeding a second threshold; and/or delete the information object based on the rating not exceeding the second threshold. In some examples, the first and/or second threshold may be multi-dimensional. In some examples, different dimensions may be assigned different weighting factors.

In some examples, one or more dimensions of the first threshold may include a higher value than a corresponding dimension of the second threshold. For example, using a single dimension scenario, a first threshold may have a required rating of 4 (on a possible scale of 1-5) for how likely the human evaluators are to buy a proposed product, whereas a second threshold may have a required rating of 2 for how likely the human evaluators are to buy a proposed product. Thus, proposed products having an unusually high (>4) likely to buy rating may be forwarded for execution, products having an average (2-4) likely to buy rating may be further revised using evolutionary algorithm techniques, and products having an unusually low (<2) likely to buy rating may be deleted from the population.

In some examples, the information object may be a proposed story outline, and the step of forwarding the information object to an execution module may include forwarding the proposed story outline to a decision maker for production of the story as at least one of a play, a film, or a book.

In some examples, the information object may be a proposed product description, and the step of forwarding the information object to an execution module may include forwarding the proposed product description to a product manufacturer.

In some examples, the product manufacturer may manage the computational linguistic program and the evolutionary algorithm, e.g. as part of an integrated electronic marketplace.

In some examples, the plurality of assessment parameters may include at least one binary parameter and at least one non-binary parameter. As used herein, "binary" parameters or other objects are those with a two possible states or answers, whereas "non-binary" parameters or other objects are those with greater than two possible states or answers. For example, a binary parameter may be whether a proposed storyline is intelligible by the human evaluator, which allows a "yes" or "no" response, whereas a non-binary parameter may be how appealing the proposed storyline is on a scale of 1-5, which allows the human evaluator five possible responses.

According to further aspects of the disclosure, a system may be provided including a memory that stores computer-executable instructions, and a processor configured to access the memory and execute the computer-executable instructions to collectively perform steps including one or more of generating an information object including descriptive language; assigning a plurality of assessment parameters and/or category to the information object; distributing the information object to a plurality of human evaluators; receiving responses from the human evaluators including assessments of the information object based on the plurality of assessment parameters and/or category; and/or rating the information object based at least in part on the responses from the human evaluators.

Examples may include instructions for forwarding the information object to an execution module based on the rating exceeding a first threshold, adjusting at least one of the descriptive language or the computational linguistic program based on the rating exceeding a second threshold, and/or deleting the information object based on the rating not exceeding the second threshold.

In some examples, the processor may be configured to assign a category identifier to the information object, and the responses received from the human evaluators may include assessments of the information object based on the plurality of assessment parameters and the category identifiers.

In some examples, the processor may be configured to distribute the information object to the plurality of human evaluators based on the category. In some examples, the processor may be configured to assign evaluator parameters to the human evaluators and to distribute the information object to the plurality of human evaluators based on the category and the evaluator parameters.

In some examples, generating the information object, and/or adjusting the descriptive language and/or the computational linguistic program may be based on information received from a social media site, a database, a news site, and/or an online reference such as a dictionary. In some examples, data may be obtained from a web index generated by a web crawler (a program that automatically traverses the World Wide Web and stores its contents). In some examples, various receivers may be used to obtain audio, e.g. from publically broadcasted television and radio feeds. The audio may be translated into text and this text could be used as an input.

In some examples, the processor may be further configured to remove the information object from further consideration based on a similarity of the information object with one or more other information objects created by the system.

According to further aspects of the disclosure, systems may be provided in which the processor is configured to generate information objects including language; present a first web interface whereby a plurality users can assess a suitability of each of the information objects; receive responses from the plurality of users including assessments of the plurality of information objects; and/or modify a first subset of the plurality of information objects based at least in part on the user assessments. In some examples, assessing the suitability of each of the information objects may include presenting a plurality of questions to each of the users.

In some examples, the processor may be further configured to present a second web interface, after modifying the first subset of information objects, whereby the plurality users can assess the suitability of each of the modified first subset of information objects.

In some examples, the processor may be further configured to receive responses from the plurality of users including assessments of the modified first subset of information objects, and to modify a second subset of the plurality of information objects from among the modified first subset of information objects based at least in part on the user assessments.

In some examples, the plurality of questions may include at least one question with a binary answer and at least one question with a non-binary answer.

In some examples, the systems and methods described herein may be presented as part of an integrated web service. As used herein, web services should be broadly understood as applying to various public and/or private network (e.g., the Internet) services including, for example, distributed databases, cloud storage, e-commerce, publishing, or similar services supported by network and/or web-based storage. In some examples, a given web service may be associated with a particular webstore or virtual storefront for a particular merchant.

In some examples, a web service such as a website, a virtual storefront, a webstore, etc., may be provided as part of an electronic marketplace, and may be managed by one or more service provider computers (e.g., servers) that host electronic content in the form of, for example, an electronic catalog, with or without associated purchase and billing functionality, may be provided for various merchants or tenants. Customers may access the web service, e.g., a virtual storefront, to view, review, discuss, order, and/or purchase items (e.g., physical items or services) from the web service.

In some examples, a web service, such as an information object creation service, may be provided to various entities/tenants including, educational, government, corporate or individual customers, and may be managed by one or more service provider computers (e.g., servers) that provide web portals, APIs and the like, through which the customers can upload, generate, modify and/or retrieve information objects to, or from, remote servers and/or databases.

According to yet further aspects of the disclosure, a computer-readable storage device may be provided storing computer-executable instructions that, when executed by one or more computer systems, configure the one or more computer systems to perform operations as discussed herein. For example, computer-executable instructions may be included for displaying a first instantiation of a computer-generated information object including language to a user; displaying a series of questions about the information object to the user; compiling responses to the series of questions from a plurality of users; determining a suitability of the first instantiation of the information object based at least in part on the responses; applying an evolutionary algorithm to at least one of the first instantiation of the information object or computer code used to generate the first instantiation of the information object; and/or generating a second instantiation of the information object based at least in part on the application of the evolutionary algorithm.

Examples may also include computer-executable instructions for determining a suitability of the second instantiation of the information object based at least in part on additional user responses; and/or forwarding the second instantiation of the information object to an execution module based on the determined suitability.

The techniques described above and below may be implemented in a number of ways and in a number of contexts. Several example implementations and contexts are provided with reference to the following figures, as described below in more detail. However, the following implementations and contexts are but a few of many.

As mentioned above, one area of study concerned with the modeling and automatic analysis and generation of language by computer is computational linguistics. Software is available that can break down sentences fairly accurately into component parts and categorize them (i.e. break them down into verbs, nouns, prepositions, etc.). There is also software that exists that can produce original and readable text from an existing corpus using probabilistic techniques. However, such text, while often amusing, is most often very poor quality.

As also mentioned previously, aspects of the present subject matter may implement various AAI techniques, for example, in providing fitness functions for one or more evolutionary algorithms. Amazon.com's® MTURK is an example of how to make accessing human intelligence simple, scalable, and cost-effective.

Using MTURK, businesses or developers needing tasks done (called Human Intelligence Tasks or "HITs") can use the MTURK APIs to access thousands of high quality, low cost, global, on-demand workers—and then programmatically integrate the results of that work directly into their business processes and systems. MTURK enables developers and businesses to achieve their goals more quickly and at a lower cost than was previously possible. As discussed herein, features such as these may be used in supporting and/or providing an AAI that can be leveraged as a fitness function for evaluating information objects using evolutionary algorithms.

According to aspects of the disclosure, an AAI, such as MTURK, may include several mechanisms to help ensure the quality of the evaluations being done. Individual workers may be required to have predefined qualifications in order to evaluate certain information objects. Plurality is another mechanism to help assess the human evaluators and maintain high quality levels.

AAI, such as MTURK, provides an automated way to tap into human intelligence to solve problems that are currently difficult for computers. One limitation of this service however is that for many (but not all) problem domains, it is quite easy to use MTURK as a 'verifier' or 'decider', but difficult to use MTURK to find solutions of significant complexity beyond 'yes' or 'no' or simple categorization. For example, it is quite common to use MTURK as a means for the categorization of images, where one is identifying an image, or an individual in an image, or looking for an object in an image. It is even easier to ask an MTURK worker 'Is this object blue?', for instance, and receive a binary answer. Given that not all workers are reliable, but most might be, it is relatively easy to repeatedly ask this question among multiple workers and receive an answer asymptotically approaching 100% certainty with time. However, it is much more difficult to ask an MTURK worker, for instance, to produce an interesting paragraph about a particular topic and receive valuable output. This technique has been used by spammers to generate search engine traffic to produce ad revenue with limited success, and most of the work produced is of little to no quality.

Evolutionary algorithms (some might say evolutionary computation), adapts the biological ideas of natural selection and evolution to produce 'fit' computer programs that evolve over time to perform a specific task. Evolutionary algorithms have been used with great success in specific domains, but there are a number of limitations that have held back the wide spread use of these tools. The algorithms work by generating random computer programs that satisfy several properties, notably that 1) they are all executable, 2) will eventually terminate or reach a finite time and space utilization limit, and 3) will produce some sort of output that can be evaluated by a fitness function. The fitness function scores the quality of the output, and this score determines the probability that a program will reproduce and produce offspring for the next generation of programs. This is demonstratively effective, but one major limitation is the challenge of finding a suitable fitness model for many problems. For instance, take the problem of producing a creative and interesting five sentence movie pitch. Although a computer can produce five syntactically correct sentences easily enough, there is currently no known computer code that can evaluate the level of 'creativeness' or 'interestingness' of those sentences.

According to certain aspects of the disclosure, systems and methods are provided that combine one or more aspects of computational linguistics programs, AAIs and evolutionary algorithms for creating and revising information objects, such as proposed storylines, product descriptions, etc.

Turning to FIG. 1, an example of a network environment 100 including an information object creation system according to aspects of the disclosure is provided. As shown in FIG. 1, a generation and evolution module 110 may include one or more access portals 112 whereby users can access the module 110 to initiate generation of a product concept, or textural concept. Access portal(s) 112 may be, for example, integrated in a web service as described herein.

The generation and evolution module 110 may include one or more interfaces for users to define parameters whereby the object to be created is guided and/or narrowed to a particular field or subject matter. This may include, for example, identification of one or more outside resources 114 that the generation and evolution module 110 may access to populate or provide data to computational linguistic algorithms, or other such programs, that are used by the generation and evolution module 110 to create concepts for items or other textural objects.

In some examples, generating the information object may be based on information received from a social media site, a database, a news site, and/or an online reference such as a dictionary. In some examples, generation and evolution module 110 may obtain data from a web index generated by a web crawler. In some examples, generation and evolution module 110 may include, or communicate with, various receivers to obtain audio, e.g. from publically broadcasted television and radio feeds. The generation and evolution module 110 may be configured to translate the captured audio into text, and use the text as an input.

As mentioned above, the generation and evolution module 110 may employ computational linguistic algorithms or other programs to create information objects that are forwarded to a fitness evaluation module 120. In general, the fitness evaluation module 120 may employ various algorithms and fitness functions to determine the quality of the object provided by generation and evolution module 110. This may involve, for example, providing the information objects to AAI 130, such as Amazon.com® (MTURK), which is widely accessible to a plurality of evaluators/users 132, 134, 136, 138 etc. The fitness evaluation module 120 may assign assessment values and/or other ratings or categories to the information objects provided by the generation and evolution module 110, based on the results of the fitness function using AAI 130.

As described further herein, evolutionary algorithms, using AAI as fitness functions, may be combined with other inputs, word preferences, feedback loops, objective criteria, social media, advertisement clicks, abbreviated or one word summaries, etc., in order to refine information objects in fitness evaluation module 120 and/or generation and evolution module 110.

Information objects that are determined to be ready for execution may be forwarded to a product execution module 140, such as various publishing and/or production systems. For example, for information objects that are related to screenplays or other story ideas, the product execution module 140 may provide the information objects to film or other production staff. For physical products, the information objects may be forwarded to certain manufacturing systems and/or entities to move forward with production of the product. In certain systems, such production may be automatically initiated within the context of an integrated electronic marketplace, such as described herein. That is, an electronic marketplace may include automated methods for the production of products represented by information objects that are determined to have sufficient value, and for marketing such products to consumers using the electronic marketplace.

In some examples, the product execution module 140 may be further configured to determine specific production systems to which individual information objects are forwarded based on categories assigned to the information objects by fitness evaluation module 120 and/or generation and evolution module 110.

Information objects that are determined by the fitness evaluation module 120 to have sufficient value for further refinement may be returned to generation and execution module 110. This may include, for example, applying and/or reapplying an evolutionary algorithm to the information object, or to an original algorithm that generated the information object, in order to generate progeny of the information object and/or originating algorithm.

In some examples, generation and execution module 110 may include a plurality of evolutionary algorithms and the evolutionary algorithm that is applied to the information object may be determined, for example, on the category of the information object.

Revised information objects that have been modified by the evolutionary algorithm may be returned to the fitness evaluation module 120 for further evaluation.

According to aspects of the system shown in FIG. 1, information objects, such as small paragraphs describing new and interesting books, movies, tv shows, and other products, may be generated and refined. There is also the potential to improve on existing text, e.g. by feeding the original text into the generation and execution module 110 and/or fitness evaluation module 120.

Generally speaking, using evolutionary algorithms and linguistic computation tools, a large number of programs are generated that read a corpus of text, or use a dictionary or other resource, and these programs generate a large number of syntactically and possibly semantically correct paragraphs that are essentially product pitches or summaries. The majority of these are expected to be low quality, but there may be a few that are of moderate quality, or if lucky one of high quality. The interesting ideas might be one in a thousand, or one in a million, but there are too many for one individual to review sequentially and in a timely manner, so these ideas would otherwise be lost. However, one can use AAI 130 as the fitness function for these evolutionary programs. AAI 130 may be employed as a decider or a categorizer. For instance, a paragraph could appear to an AAI 130 user and the following workflow would initiate with these associated questions:

Does this paragraph make sense to you? (if yes, continue, if no, give 0 fitness score)

Does the paragraph describe something interesting? (if yes, continue, if no, give a slightly higher fitness score)

Does the paragraph describe a plot or story? (if yes, continue, if no, perhaps switch to workflow for product descriptions).

At this point questions can be asked such as:

What appeal does this story have to you on a scale of 1 to 5?

How much do you identify with it on a scale of 1 to 5?

These questions will result in a suitable fitness score.

Likewise questions for products can be asked such as

How useful would the product described be useful to you on a scale of 1 to 5? or How likely would you be to buy this product if it existed, on a scale of 1 to 5?

These fitness scores may be used to generate new programs which would then repeat the loop. As the loop between modules 110 and 120 continues, the quality of the information objects should get higher as programs compete and evolve to produce better work that is associated with higher fitness scores.

FIGS. 2-6 illustrate example flow diagram showing respective processes 200, 300, 400, 500 and 600 for implementing processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 2:
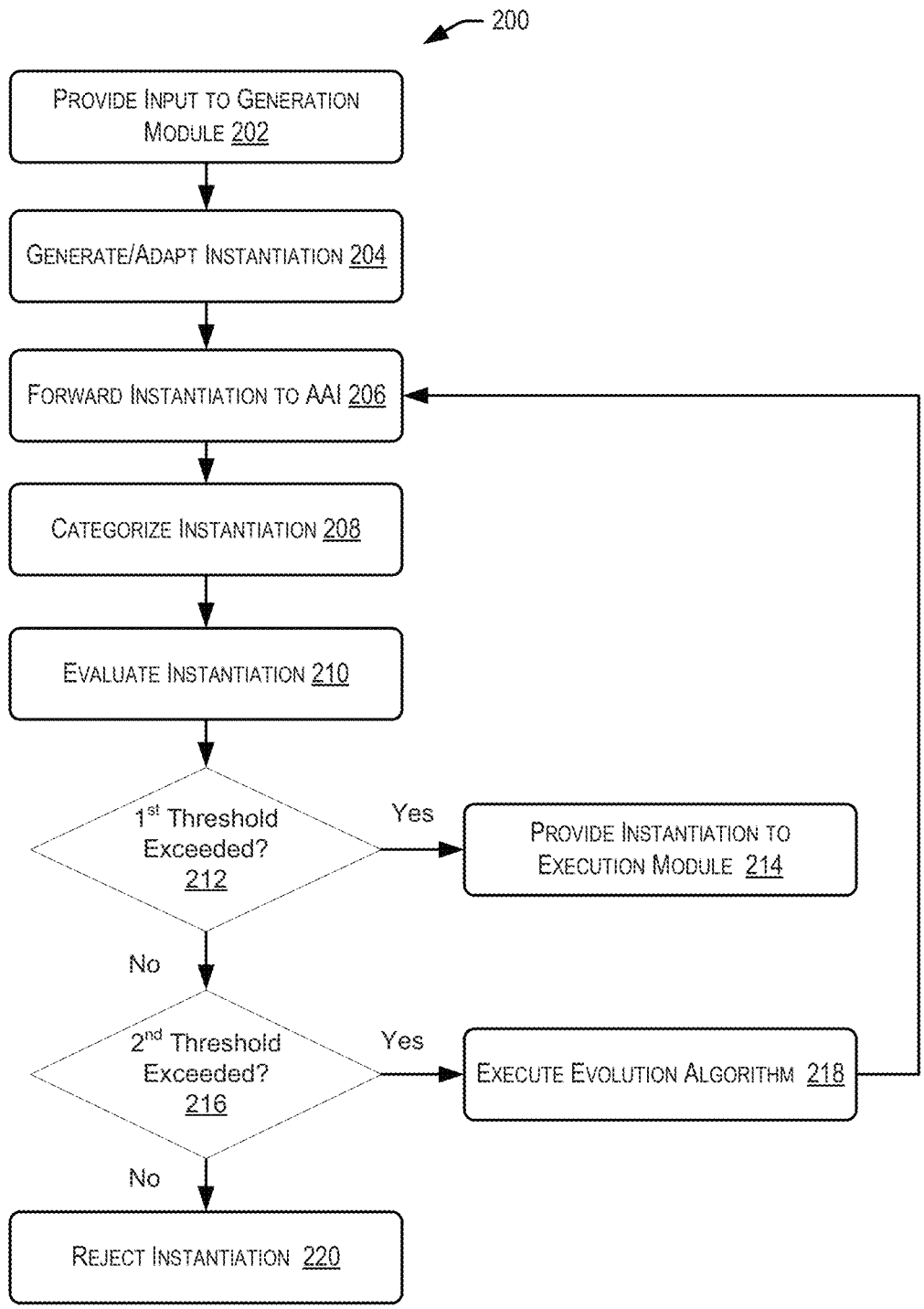
FIG. 2 is a flow diagram depicting an example flow including generating and revising an information object as described herein, according to at least one example.

FIG. 2 depicts an illustrative flow 200 in which techniques for generating and evaluating unique information objects may be implemented. In illustrative flow 200, operations may be performed by one or more processors of one or more service provider computers and/or instructions for performing the operations may be stored in one or more memories of the service provider computers.

The flow 200 may begin at 202, in which an input is provided to an object generation module. The input may be directly provided by a requesting user and/or may be accessed by a generation module from other resources. For example, users may define parameters by which the generation module is to create new information objects, and/or the generation module may access any number of outside resources including databases, social media networks, dictionaries, etc., to fill and/or modify values included in an object generating algorithm.

The method may continue in 204, in which an instantiation of the information object may be created. This may include, for example, feeding any input provided by the user or accessed by the generation module in 202 to a computational linguistic algorithm or similar program.

Once the information object is created in 204, the flow 200 may proceed with 206. In 206, the instantiation of the information object is provided to an AAI for evaluation of the information object. The AAI may include, for example, a web based system that allows human reviewers to evaluate various information objects. In some examples, the AAI may be configured to match the information objects with appropriate reviewers based on language skills, interests, etc.

The flow 200 may continue with 208, in which the information object may be categorized. This may be done, for example, via AI and/or AAI. That is, there may be algorithms by which the information object is categorized by using an AI, or the information object may be provided to an AAI for human categorization. In some examples, a combination of these two methods may be used, whereby automatic categorization by an AI may be attempted, and if unsuccessful, the information object may be forwarded to an AAI for categorization. As such, and as will be discussed further below, the specific questions presented in the AAI may be adapted based on automated processes performed on the information object prior to forwarding to the AAI. That is, questions such as categorization, or other automated techniques, may influence the AAI process depending on their success.

The flow 200 may continue with 210, in which the information object is evaluated by the AAI, for quality. As discussed herein, evaluation of the information object by the AAI for quality may involve many different techniques, but will commonly include human evaluation such as whether or not a product is desirable, whether or not a story or plot makes sense, and any number of subjective evaluations of the quality thereof.

Evaluation of the information object in 210 will typically include application of one or more fitness functions to determine the fitness of the information object. Parameters used for the fitness function may be programmed and/or adapted by the requesting user in 202. For example, the requesting user may request certain feedback on particular aspects of the information object, or automated methods may assign particular questions, or other criteria, depending on automatic analysis of the information object.

The flow 200 may optionally continue with 212, in which the results of the evaluation performed in 210 are comparative to a first threshold. The first threshold, may be, for example, a value determined to be sufficient for forwarding the information object to execution. The first threshold may be determined, based on, for example, requesting user input provided in 202, limits set by production systems linked to the object creation and evaluation system, or parameters set by the service provider managing the creation system. In some examples, the first threshold may be multi-dimensional and/or may depend on the category of the information object or other dynamic properties determine for example in 208, 210.

If the first threshold is exceeded, the flow 200 may continue with 214, in which the information object may be provided to an execution module, e.g. for production and release of a product, or distribution of a story concept.

If the first threshold is not exceeded, the flow 200 may continue with 216, in which the results of the evaluation in 208, 210 are analyzed to determine whether a second threshold is exceeded. The second threshold may be, for example, a qualitative threshold having one or more dimensions, whereby the information object is determined to be sufficiently viable to feed back into the evolutionary algorithm for further refinement and evaluation.

If the second threshold is exceeded, the method may continue with 218, in which the information object is fed to an evolution algorithm, or the evolution algorithm is applied to the object creation algorithm used to generate the information object. This may result with the flow 200 returning to 206 where the revised information object or a newly created information object created by an adapted generation algorithm is fed back to the AAI.

It should be noted that information objects that may be processed in 214 may also be further refined via such processes e.g. by re-feeding the information objects from 214 to 218.

If the information object does not exceed the second threshold, the flow 200 may proceed with 220, in which the information object may be rejected or deleted. As part of 220, an evolutionary algorithm may be applied to the creation algorithm used to generate the information object, e.g. to improve subsequent instantiations of the data object, as discussed further herein.

Figure 3:
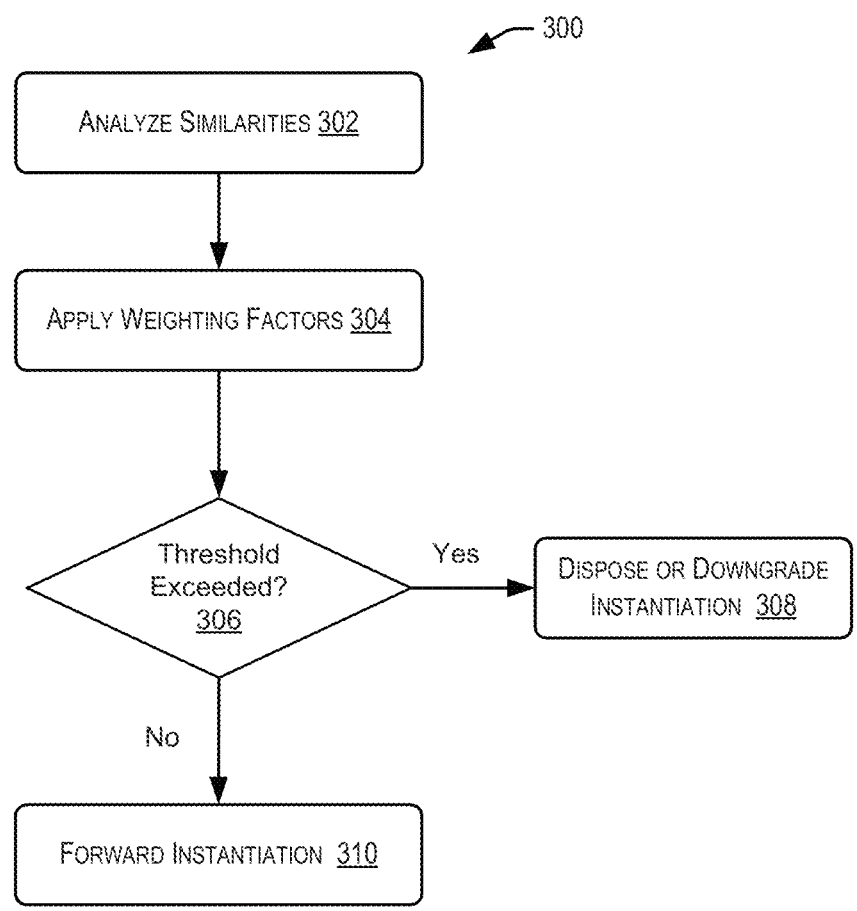
FIG. 3 is a flow diagram depicting an example flow including steps for limiting a number of information objects as described herein, according to at least one other example.

Turning to FIG. 3, an exemplary flow 300 is shown for removing an inordinate number of similar information objects. In illustrative flow 300, operations may be performed by one or more processors of one or more service provider computers and/or instructions for performing the operations may be stored in one or more memories of the service provider computers.

One possible problem that the following flow may be used to address is where the creation of new ideas are inhibited by recycling minor variations of existing works that previously scored high with no additional value. This can result in the substantially similar high-scoring objects flooding the system, drowning out lower scoring programs with the potential to generate more interesting ideas. As such, it may be beneficial to cull similar high-scoring objects from the population.

The flow 300 may begin in 302, in which similarities of a given information object may be compared with other information objects. This may be performed, for example, as part of step 218 show in FIG. 2 or during other execution of evolutionary algorithms and similar programming. Such analysis may include linguistic comparison, feature comparison, or other techniques that recognize the number and/or quality of similarities between information objects. In some examples, this may include comparing the language of one information object to previous information objects. In other examples, content of images or product features may be compared. The comparison may include multi-dimensional analysis, e.g. where several parameters of the information object are compared, with or without unique weighting factors.

The flow 300 may continue with 304, in which any appropriate weighting factors may be applied to detected similarities. For example, certain features, such as color, may be determined to have little unique value, and a reduced weighting factor may be applied. On the other hand, parameters such as the "action" or "characters" in a storyline paragraph may have greater value and may have an increased weighting factor applied.

The flow 300 may continue with 306, in which a determination may be made regarding whether a similarity threshold is exceeded. This may include, for example, assessing the similarity of language and/or features included in the information object compared to other information objects. Alternatively, or additionally, an AAI may be used to evaluate the similarity of objects. For example, a plurality of information objects that are determined to be potentially similar (e.g. semantically) may be distributed together to an AAI in order for the human evaluators to rank the similarities (e.g. syntactically). This may be particularly useful in detecting objects that are syntactically different but semantically similar.

If the similarity threshold is exceeded in 306, the flow may continue with 308, in which the information object may be deleted or the suitability score downgraded (which may lead to deletion if low enough).

If the similarity threshold is not exceeded in 306, the flow may continue with 310, in which the information object may be forwarded for further processing, e.g. forwarded for execution or further refinement via the evolutionary algorithm.

It is noted that, rather than (or in combination with) using a "similarity threshold," the flow 300 may use a "uniqueness threshold" that looks at differences between the information object and other information objects. Accordingly, if there is a particularly important difference, the information object may be allowed to proceed with 310, even if there are other substantial similarities.

Other approaches may also be used, alone or in addition to the flow shown in FIG. 3, including, for example, configuring the generation algorithm to generate different text using a randomization function, or using another set of AAI workers to compare newer generation works to older generation works. If newer generation objects are verified as simpler, their fitness score may be significantly reduced as they are not contributing anything new of value.

Figure 4:
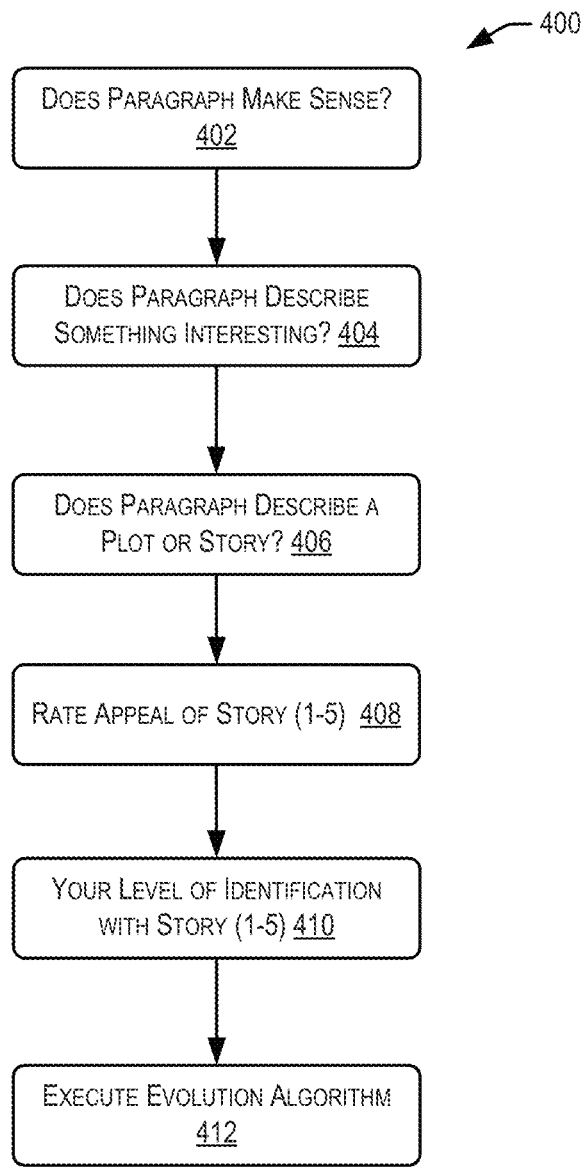
FIG. 4 is a flow diagram depicting an example flow including questions for rating a created storyline as described herein, according to at least one other example.

Turning to FIG. 4, an exemplary flow 400 is shown for evaluating a proposed storyline by a human reviewer. In illustrative flow 400, operations may be performed by one or more processors of one or more service provider computers and/or instructions for performing the operations may be stored in one or more memories of the service provider computers.

As discussed previously, systems may dynamically determine the appropriate questions or line of questioning pertaining to a given information object. As such, all or part of the flow shown in FIG. 4 may be applied, for example, when an information object is categorized as a proposed storyline, whereas all or part of the flow described below with reference to FIG. 5 may be implemented when an information object is categorized as a proposed product.

The flow 400 may begin with 402, in which a human reviewer may be presented with an information object, in this case a text paragraph including a proposed storyline, and asked to determine whether paragraph makes sense. If the reviewer responds that the paragraph does not make sense, the flow may stop and return a "0" value for the proposed storyline.

In some examples, the reviewer's response to baseline questions such as 402 may also be used to assess the reviewer's skill or comprehension. For example, if 99% of reviewers response that a given paragraph makes sense, the 1% of reviewers that respond that the paragraph does not make sense may have their comprehension score reduced by the system. On the other hand, a small minority of reviewers that understand a paragraph may be explained by the paragraph including unusually difficult or foreign words. Therefore, in some examples, the system may evaluate seemingly anomalous responses to determine whether there is an apparent cause for the discrepancy. In some cases, unusual comprehensive ability for a given reviewer may be detected and upgraded as part of the process.

The flow 400 may continue with 404, in which the human reviewer may be asked to determine whether the paragraph describes something interesting. If the reviewer responds that the paragraph is not interesting, the flow may stop and return a "0" value for the proposed storyline.

In this instance, the complexity of the evaluation for the reviewer increases from 402 to 404, even though both are binary answers. That is, it takes more analysis to determine whether a paragraph is interesting, than to determine if a paragraph makes sense. This concept can applied throughout to efficiently evaluate information objects, i.e. by quickly assigning "0" values to unintelligible or uninteresting paragraphs, and increasing the complexity of rating the information objects as the process continues.

The flow 400 may continue with 406, in which the human reviewer may be asked to determine whether the paragraph describes a plot or story. If the reviewer responds that the paragraph does not describe a plot or story, the flow may stop and return a "0" value for the proposed storyline.

The flow 400 may continue with 408, in which the human reviewer may be asked to rate the appeal of the story on a given scale (e.g. 1-5). In this step, the flow may shift from binary to non-binary responses. That is, the "how appealing" parameter may have more than two states, allowing for further qualitative assessment.

The reviewer's response to 408 may also be used to categorize the reviewer, e.g. based on a category or parameter of the paragraph and the reviewer's perceived appeal for the storyline. For example, if the paragraph is categorized as a "Western" and the reviewer rates it as very appealing, a profile of the reviewer may be dynamically updated to include a category or increase a preference for Westerns for the reviewer.

The flow 400 may continue with 410, in which the human reviewer may be asked to rate their level of identification with the story on a given scale (e.g. 1-5). As with 408, this may include a non-binary response.

The reviewer's response to 410 may also be used to categorize the reviewer, e.g. based on a category or parameter of the proposed product and the reviewer's self-identification with the story. For example, if the paragraph is categorized as "Military Fiction" and the reviewer rates it as having a very high level of self-identification, a profile of the reviewer may be dynamically updated to include a category of "military" for the reviewer. In some examples, the reviewer may be queried to confirm such profile changes before implementation.

In 412, the responses to any of questions 402-412 may be communicated to an AAI or fitness evaluation module such as shown in FIG. 1 in order to rate the suitability of the paragraph. Execution of an evolution algorithm as described herein may also be initiated based on one or more of such responses and may be used, for example, to modify the paragraph or modify the program that created the paragraph.

The responses for a given paragraph may vary based on the number of questions that the reviewer answers, or the answers may be dynamically combined so that only a single "value" is returned to the AAI. For example, answering "no" to any of the binary questions may automatically stop the process and return a "0" value, whereas if the flow proceeds to non-binary responses, each non-binary response, or a sum of the non-binary responses, may be returned.

Figure 5:
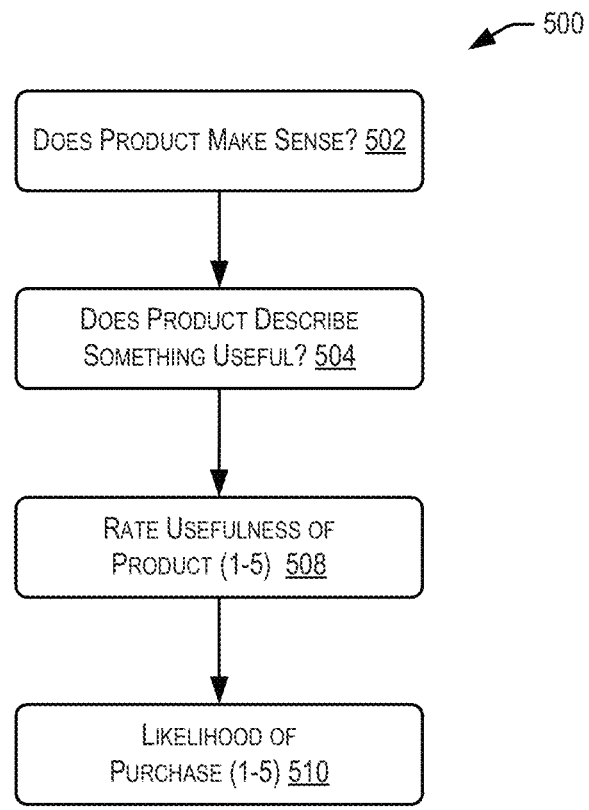
FIG. 5 is a flow diagram depicting an example flow including questions for rating a product description as described herein, according to at least one other example.

Turning to FIG. 5, an exemplary flow 500 is shown for evaluating a proposed product by a human reviewer. In illustrative flow 500, operations may be performed by one or more processors of one or more service provider computers and/or instructions for performing the operations may be stored in one or more memories of the service provider computers.

The flow 500 may begin with 502, in which a human reviewer may be presented with an information object, in this case a proposed product description, and asked to determine whether the product description makes sense. If the reviewer responds that the product does not make sense, the flow may stop and return a "0" value for the proposed product.

In some examples, the reviewer's response to baseline questions such as 502 may also be used to assess the reviewer's skill or comprehension. For example, if 99% of reviewers respond that a given product makes sense, the 1% of reviewers that respond that the product does not make sense may have their comprehension score reduced by the system. On the other hand, a small minority of reviewers that understand a proposed product may be explained by the product being unusually complex and/or each of the reviewers that understand the proposed product having a particular skill. Therefore, in some examples, the system may evaluate seemingly anomalous responses to determine whether there is an apparent cause for the discrepancy. In some cases, unusual comprehensive ability for a given reviewer may be detected and upgraded as part of the process.

The flow 500 may continue with 504, in which the human reviewer may be asked to determine whether the product description describes something useful. If the reviewer responds that the product is not useful, the flow may stop and return a "0" value for the proposed product.

In this instance, the complexity of the evaluation for the reviewer increases from 502 to 504, even though both are binary answers. That is, it takes more sophistication to determine whether a product would be useful, than to determine if a description makes sense. This concept can applied throughout to efficiently evaluate information objects, i.e. by quickly assigning "0" values to unintelligible or useless product ideas, and increasing the complexity of rating the information objects as the process continues.

As with 502, the reviewer's response to 504 may also be used to assess the reviewer's skill or comprehension. In some cases, unusual comprehensive ability (positive or negative) for a given reviewer may be detected and upgraded using the response to 504.

The flow 500 may continue with 508, in which the human reviewer may be asked to rate the usefulness of the product on a given scale (e.g. 1-5). In this step, the flow may shift from binary to non-binary responses. That is, the "how useful" parameter may have more than two states, allowing for further qualitative assessment.

The reviewer's response to 508 may also be used to categorize the reviewer, e.g. based on a category or parameter of the proposed product and the reviewer's perceived usefulness for the proposed product. For example, if the proposed product is categorized as a "gardening tool" and the reviewer rates it as very useful, a profile of the reviewer may be dynamically updated to include a category of "gardener" for the reviewer.

The flow 500 may continue with 510, in which the human reviewer may be asked to rate their likelihood of purchasing the product on a given scale (e.g. 1-5). As with 508, this may include a non-binary response.

The reviewer's response to 510 may also be used to categorize the reviewer, e.g. based on a category or parameter of the proposed product and the reviewer's likelihood to purchase the proposed product. For example, if the proposed product is categorized as a "gardening tool" and the reviewer rates it as very likely to buy, a profile of the reviewer may be dynamically updated to include a category of "gardener" for the reviewer.

The responses to any of questions 502-510 may be communicated to an AAI or fitness evaluation module such as shown in FIG. 1 in order to rate the suitability of the proposed product. The responses for a given product may vary based on the number of questions that the reviewer answers, or the answers may be dynamically combined so that only a single "value" is returned to the AAI. For example, answering "no" to any of the binary questions may automatically stop the process and return a "0" value, whereas if the flow proceeds to non-binary responses, each non-binary response, or a sum of the non-binary responses, may be returned.

Figure 6:
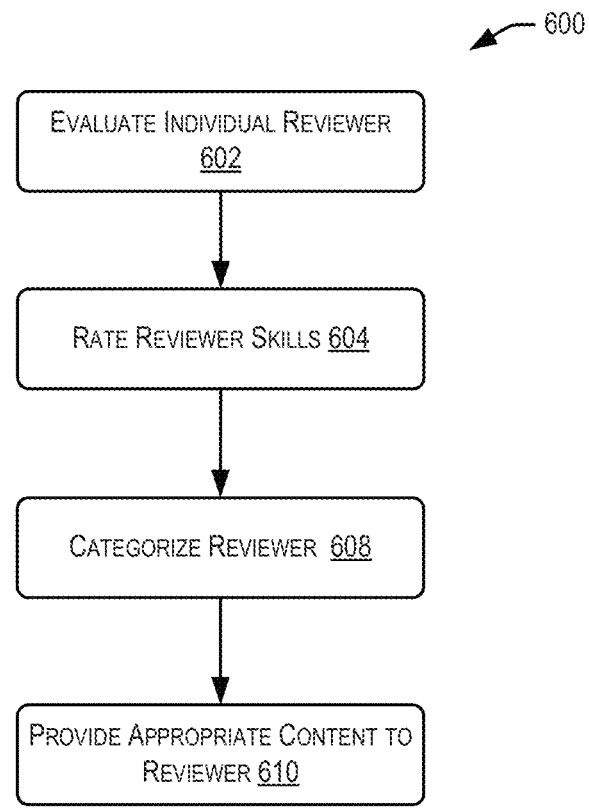
FIG. 6 is a flow diagram depicting an example flow for rating and/or categorizing a reviewer, according to at least one other example.

Turning to FIG. 6, an exemplary flow 600 is shown for tailoring the information objects that are provided to a particular human reviewer. In illustrative flow 600, operations may be performed by one or more processors of one or more service provider computers and/or instructions for performing the operations may be stored in one or more memories of the service provider computers.

The flow 600 may begin with 602, in which a human reviewer may be evaluated, e.g. via a web portal and/or as part of ongoing AAI reviews provided by the reviewer. The assessment may include providing specific questions to the reviewer to test their knowledge, or comprehension of a certain subject or language, their ability to follow instructions, etc. The assessment may be performed automatically and/or dynamically as the reviewer provides an assessment for one or more information objects, e.g. by comparing the reviewer's responses for conformity with other responses, timeliness, or other predetermined criteria.

The flow 600 may continue with 604, in which individual skills of the reviewer may be ranked or otherwise recorded for later reference. Such ranks may be assigned based on a scale, e.g. 1-10, or may be binary "qualified" or "not qualified" ranks.

In some examples, the evaluation and/or ratings may be based at least in part on preferences, that the reviewer provides or that the system automatically estimates. For example, the reviewer may volunteer that they are interested in science fiction stories, or the system may infer that the reviewer is interested in science fiction stories based on a history of books purchased, movies or tv shows streamed, social media or Internet browsing. Such information may be gathered, for example, from a user account maintained by an electronic marketplace provider, from a user's social media account, browser history, etc.

The flow 600 may optionally continue with 608 in which the reviewer may be assigned to one or more categories. Such categories may include, for example, languages, media types, demographics, or other relevant categories used to determine the information objects that the reviewer is interested in or capable of reviewing and/or to weight or categorize the reviewer's evaluations of information objects. For example, a reviewer may be categorized as an English and Spanish speaker, making them available to review English and Spanish information objects. The reviewer may also be categorized as having special interest or knowledge about a particular subject or product area, in which case information object evaluations by the reviewer in those subject or product areas may be weighted more heavily than other reviewer evaluations.

The flow 600 may continue with 610, in which appropriate content, e.g. information objects, may be provided to the reviewer for evaluation by an AAI. The content may be selected, for example, based on the skill ratings of the reviewer compared to parameters of the information object, by categories of the reviewer compared to categories of the information object, etc.

Figure 7:
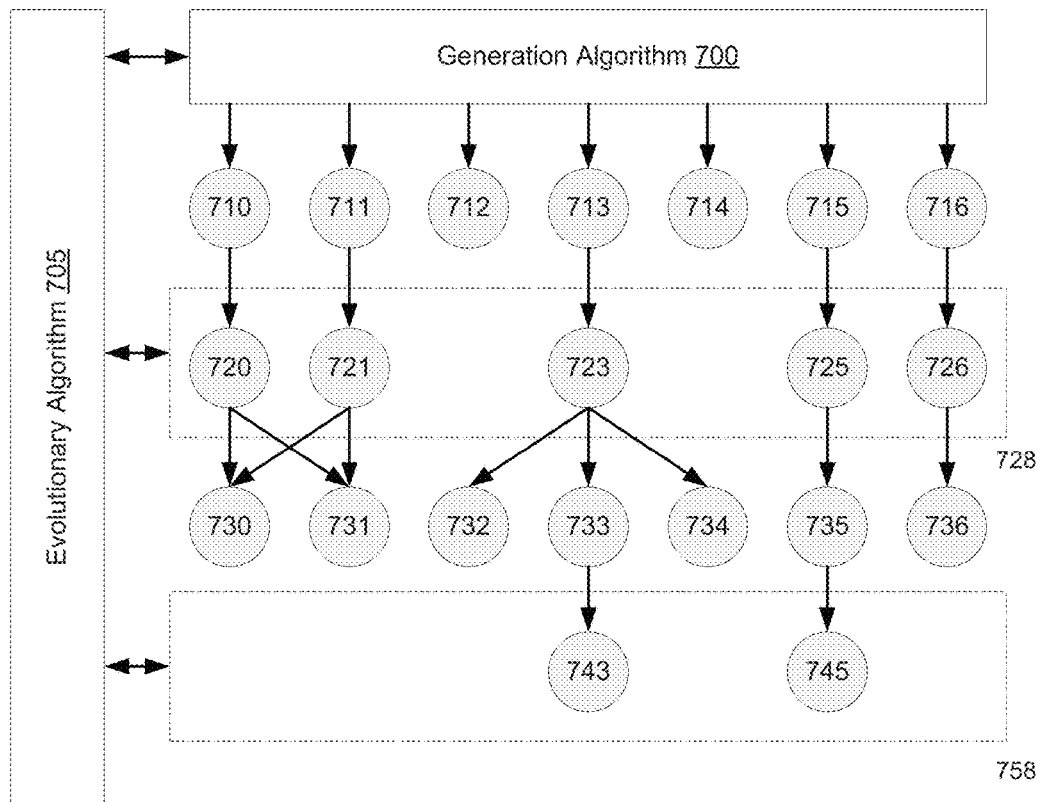
FIG. 7 illustrates aspects of an information object population creation and refinement process, according to at least one other example.

FIG. 7 illustrates aspects of generation and refinement of various information discussed herein. As shown in FIG. 7, generation algorithm 700 may create a first set of information objects 710-716. In some examples, information objects 710-716 may include similar assessment parameters and/or category, and may be directed to similar subject matter.

Based on a first assessment, e.g. via AAI as discussed herein, the information objects 710-716 may be refined to a first subset 728 including information objects 720, 721, 723, 725 and 726. In some examples, one or more of the information objects in first subset 728 may be modified by evolutionary algorithm 705 and/or evolutionary algorithm 705 may be used to modify generation algorithm 700 in order to create a new set of information objects (not shown).

In the example shown in FIG. 7, the application of evolutionary algorithm 705 to first subset 728 results in a number of different progeny of information objects 720, 721, 723, 725 and 726. For example, information objects 720 and 721 are combined in different ways to produce information objects 730, 731. This may include, for example, weighting parameters from IO 720 more heavily in producing IO 730, and weighting parameters from IO 721 more heavily in producing IO 731.

Multiple progeny may also be produced from a single information object. For example, information objects 732, 733 and 734 may be produced by direct modification of IO 723 by the evolutionary algorithm 705. In some instances, this may include applying different weighting factors to different parameters of IO 723, or other techniques that produce different results from similar input.

Individual information objects may be modified on a 1-1 basis, such as IO 725 modified to IO 735 and IO 726 modified to IO 736. Thus, it is possible in some examples for different information objects in a subset to be handled differently by the evolutionary algorithm 705. The different handling may be prompted, for example, based on user responses to specific question in the AAI process, or may result from an analysis of the information objects by the evolutionary algorithm 705.

The set of information objects 730-736 may be subjected to a second assessment, such as using AAI techniques, resulting in a second subset of information objects 743, 745. In some examples, one or more similar information objects may be disregarded even though they pass an assessment threshold. For example, IO 735 and 736 may both be assessed as exceeding the threshold for further processing, but be determined to be substantially similar or identical. In some examples, the system may keep a record of 736 and attach it to 735 such that future evaluators could examine the similar information object, if desired.

In some examples, similar thresholds may be applied in the first and second assessment. For instance, both the first and second assessment may apply a first threshold to determine if any of the objects are ready for execution, and apply a second (lower) threshold to determine if any remaining objects are suitable for further refinement.

Other examples may apply different thresholds in different assessments. For instance, first subset 728 may be determined using only one threshold level that looks for possibly valuable objects, whereas second subset 758 may be determined using a higher threshold level that looks for objects that are ready for execution.

The process of applying the evolutionary algorithm to subsets of information objects and/or the generation algorithm may be repeated any number of times to further refine the population of information objects and develop more suitable information objects.

Figure 8:
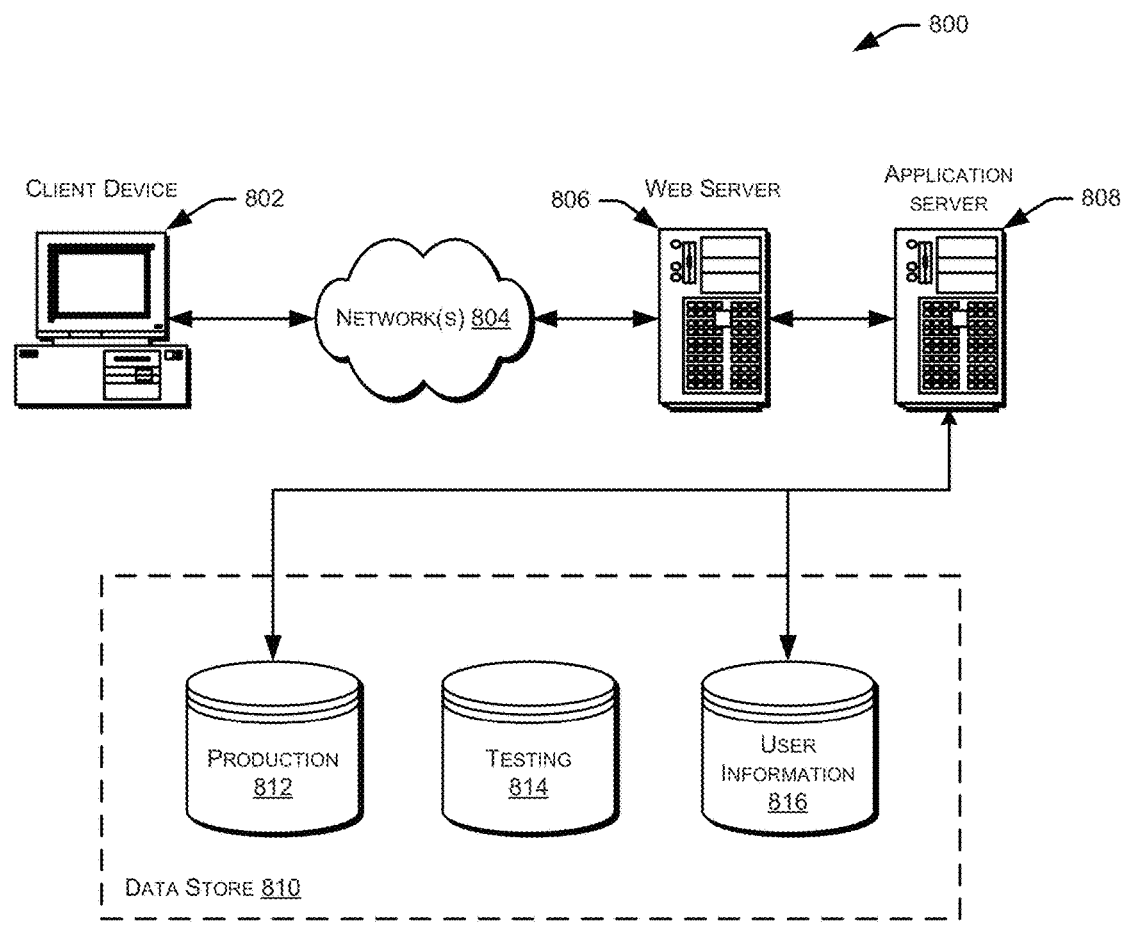
FIG. 8 illustrates an example architecture for implementing information object creation and evaluation as described herein, according to at least one other example.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
generating, by a computational linguistic program on a computer system, an information object including descriptive language;
assigning a plurality of assessment parameters to the information object;
assigning a category identifier to the information object;
distributing, by a computerized network, the information object to a plurality of human evaluators;
receiving responses from the human evaluators including assessments of the information object based at least in part on the plurality of assessment parameters and the category identifier;
rating, by an evolutionary algorithm, the information object based at least in part on the responses from the human evaluators; and
automatically selecting between at least the options of:
forwarding the information object to an execution module based at least in part on the rating exceeding a first threshold,
adjusting at least one of the descriptive language or the computational linguistic program based on the rating exceeding a second threshold, or
deleting the information object based on the rating not exceeding the second threshold,
wherein the method includes generating and rating a plurality of the information objects, and forwarding information objects exceeding the first threshold to the execution module, adjusting the at least one of the descriptive language or the computational linguistic program for information objects exceeding the second threshold, and deleting information objects not exceeding the second threshold.

2. The computer-implemented method of claim 1, wherein the information object is a proposed story outline, and the step of forwarding the information object to an execution module includes forwarding the proposed story outline to a decision maker for production of the story as at least one of a play, a film, or a book.

3. The computer-implemented method of claim 1, wherein the information object is a description for a proposed product, and the step of forwarding the information object to an execution module includes forwarding the proposed product description to a product manufacturer.

4. The computer-implemented method of claim 3, wherein the product manufacturer manages the computational linguistic program and the evolutionary algorithm.

5. The computer-implemented method of claim 1, wherein at least one of the assessment parameters or the category identifier is assigned by a user.

6. The computer-implemented method of claim 1, wherein at least one of the assessment parameters or the category identifier is automatically assigned by the computer system.

7. A system, comprising:
a memory that stores computer-executable instructions; and
a processor configured to access the memory and execute the computer-executable instructions to collectively at least:
generate, by a computational linguistic program, an information object including descriptive language;
assign a plurality of assessment parameters to the information object;
distribute, by a computerized network, the information object to a plurality of human evaluators;
receive responses from the human evaluators including assessments of the information object based on the plurality of assessment parameters;
rate, by an evolutionary algorithm, the information object based at least in part on the responses from the human evaluators; and
at least one of:
forward the information object to an execution module based on the rating exceeding a first threshold,
adjust at least one of the descriptive language or the computational linguistic program based on the rating exceeding a second threshold, or
delete the information object based on the rating not exceeding the second threshold,
wherein the system is further configured to generate and rate a plurality of the information objects and to forward any of the information objects exceeding the first threshold to the execution module, adjust the at least one of the descriptive language or the computational linguistic program for each of the information objects exceeding the second threshold, and to delete information objects not exceeding the second threshold.

8. The system of claim 7, wherein the system is further configured to assign a category identifier to the information object, and the responses received from the human evaluators include assessments of the information object based on the plurality of assessment parameters and the category identifier.

9. The system of claim 8, wherein the system is further configured to distribute the information object to the plurality of human evaluators based on the category identifier.

10. The system of claim 9, wherein the system is further configured to assign evaluator parameters to the human evaluators and to distribute the information object to the plurality of human evaluators based on the category identifier and the evaluator parameters.

11. The system of claim 7, wherein the information object is at least one of a story outline or a product description.

12. The system of claim 7, wherein the plurality of assessment parameters include at least one binary parameter and at least one non-binary parameter.

13. The system of claim 7, wherein generating the information object is based on information received from a social media site.

14. The system of claim 7, wherein adjusting the at least one of the descriptive language or the computational linguistic program is based on information received from a social media site.

15. The system of claim 7, wherein the system is further configured to remove the information object from further consideration based on a similarity of the information object with one or more other information objects created by the system.

16. A system, comprising:
a memory that stores computer-executable instructions; and
a processor configured to access the memory, the processor configured to access the memory and execute the computer-executable instructions to collectively at least:
generate information objects including language;
present a first web interface whereby a plurality of users can assess a suitability of each of the information objects;
receive responses from the plurality of users including assessments of the information objects; and
modify a first subset of the information objects based at least in part on the user assessments,
wherein assessing the suitability of each of the information objects includes presenting a plurality of questions to each of the users, and
wherein the system is configured to generate and assess the suitability of a plurality of the information objects, and to forward information objects having a suitability exceeding a first threshold to an execution module, modify the language of information objects having a suitability exceeding a second threshold, and delete information objects having a suitability not exceeding the second threshold.

17. The system of claim 16, further comprising instructions to collectively at least:
after modifying the first subset of information objects, present a second web interface whereby the plurality of users can assess a suitability of each of the modified first subset of information objects;
receive responses from the plurality of users including assessments of the modified first subset of information objects; and
modify a second subset of the information objects from among the modified first subset of information objects based at least in part on the user assessments.

18. The system of claim 16, wherein the system is further configured to remove one or more of the information objects from further consideration based on a similarity of the one or more information objects with another information object created by the system.

19. A non-transitory computer-readable storage device storing computer-executable instructions that, when executed by one or more computer systems, configure the one or more computer systems to perform operations comprising:
displaying a first instantiation of a computer-generated information object including language to a user;
displaying a series of questions about the information object to the user;
compiling responses to the series of questions from a plurality of users;
determining a suitability of the first instantiation of the information object based at least in part on the responses;
applying an evolutionary algorithm to at least one of the first instantiation of the information object or computer code used to generate the first instantiation of the information object; and
generating a second instantiation of the information object based at least in part on the application of the evolutionary algorithm,
wherein the computer-executable instructions are configured to generate and determine the suitability of a plurality of the information objects, and to forward information objects with a suitability exceeding a first threshold to an execution module, modify the language of information objects with a suitability exceeding a second threshold, and delete information objects with a suitability not exceeding the second threshold.

20. The computer-readable storage device of claim 19, further comprising computer-executable instructions for:
determining a suitability of the second instantiation of the information object based at least in part on additional user responses; and
forwarding the second instantiation of the information object to an execution module based on the determined suitability.

21. The computer-readable storage device of claim 19, wherein the information object is a description of a proposed product not yet in production.

22. The computer-readable storage device of claim 21, further comprising instructions for forwarding the information object to a manufacturing system that automatically begins producing the proposed product that is described based at least in part on the suitability of an instantiation of the information object exceeding the first threshold.

* * * * *

UNITED STATES PATENT AND TRADEMARK OFFICE
CERTIFICATE OF CORRECTION

PATENT NO. : 9,589,228 B1
APPLICATION NO. : 14/207334
DATED : March 7, 2017
INVENTOR(S) : Christopher Albert Gorski Page 1 of 1

It is certified that error appears in the above-identified patent and that said Letters Patent is hereby corrected as shown below:

On the Title Page

In Item (72), after "Christopher", delete "Alex", insert --Albert--.

Signed and Sealed this
Sixteenth Day of May, 2017

Michelle K. Lee
*Director of the United States Patent and Trademark Office*